June 3, 1952 W. F. DART 2,599,320
MEASURING TAPE AND CASE THEREFOR
Filed July 29, 1950

INVENTOR.
William F. Dart
BY Otto A. Earl
Attorney.

Patented June 3, 1952

2,599,320

UNITED STATES PATENT OFFICE 2,599,320

MEASURING TAPE AND CASE THEREFOR

William F. Dart, Mason, Mich.

Application July 29, 1950, Serial No. 176,669

7 Claims. (Cl. 242—84.9)

This invention relates to improvements in a measuring tape and case therefor.

The principal objects of this invention are:

First, to provide a novel form of case for a steel measuring tape which is easily assembled with the tape.

Second, to provide a novel form of brake for frictionally restraining the inward motion of a measuring tape into its case.

Third, to provide a case for a measuring tape which is particularly adapted for making both inside and outside measurements.

Fourth, to provide a restraining brake for a measuring tape which will not deface or obliterate the scale indicia and numerals on the tape.

Other objects and advantages relating to details of my invention will be apparent from a consideration of the following description and claims.

The drawings, of which there is one sheet, illustrate a preferred form of my tape and case.

Figure 2:
Fig. 2 is a top plan view of the case with the tape partially extended.

My measuring tape and case are illustrated in the form of the familiar type of measuring tape for measuring relatively short distances, usually up to six feet. The tape itself consists of a steel or other flexible metal band 1 having scale indicia or graduations 2 marked on each side thereof. The outer or leading end of the band is provided with a hooked clip 3 having a downturned end and the scale graduations on the top side of the tape as shown in Fig. 2 are positioned to measure from the inside of the hook clip 3 for measuring outside dimensions as when the hook is engaged over the end of an object to be measured. The scale graduations on the under side of the band 1 are positioned so as to indicate measurements from the outside of the hook 3 when the hook and the end of the tape are abutted against the inside of an interior distance to be measured.

The case for extensibly containing the band 1 in coiled position consists of a generally rectangular body 4 which is conventionally formed of molded plastic but may be constructed of other materials. The body 4 includes a back wall 5 with peripherally located side walls 6 and a top wall 7 and bottom wall 8 projecting therefrom to form a recess 9 opening to one side of the body. A boss or post 10 projects from the back wall 5 into the center of the recess 9.

The front edges of the peripheral walls of the body are grooved as at 11 completely around the case and the periphery of the rear wall 5 is similarly grooved as at 12 to receive inwardly turned flanges 13 on the front cover plate 14 and a back cover plate 15. The cover plates are retained on the case by means of screws 16 threaded into holes tapped in the central boss 10. The front cover 14 thus serves to close the recess 9 in the case.

Figure 4:
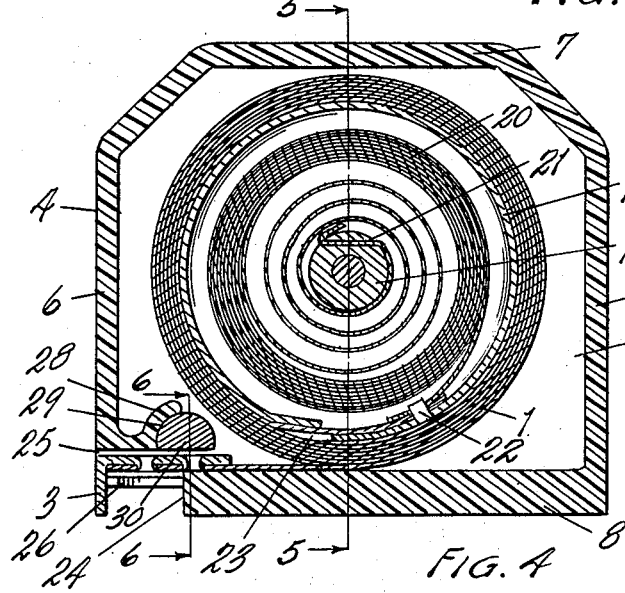
Fig. 4 is a vertical cross sectional view longitudinally through the tape and case taken along the plane of the line 4—4 in Fig. 5.
Figure 5:
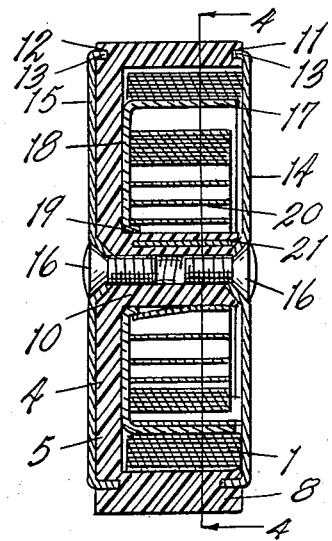
Fig. 5 is a vertical transverse cross sectional view through the tape and case taken along the plane of the line 5—5 in Figs. 1 and 4.

The band 1 of the tape is received in a coil in the case by being wound upon a drum 17 rotatably mounted on the boss or post 10. For this purpose, the drum 17 is provided with a flat circular end wall 18 with a central flanged opening 19 rotatably mounted on the post. The drum 17 is spring urged to wind in the band 1 by means of a coil spring 20 positioned around the post 10 and within the drum 17. The inner end of the spring 20 is anchored to the post 10 by being passed through a chordal slot 21 in the post and bent backwardly around the edge of the slot. The outer end of the coil spring 20 is anchored to the periphery of the drum 17 by means of ears 22 struck through a hole in the end of the spring. Ears 22 also serve to connect the inner end of the band 1 to the drum, the inner end of the band being extended into the drum through the slot 23 for this purpose. It will thus be seen that the spring 20 constantly tends to rotate the drum in a counter-clockwise direction as viewed in Fig. 4 to reel in the band on the exterior of the drum.

Figure 3:
Fig. 3 is a bottom plan view of the case with the tape partially extended.

The bottom wall 8 of the case is cut away or notched as at 24 along the left corner of the case to provide an entrance and exit slot 25 for the band through which the band emerges from the case. The slot 25 is of sufficient thickness to receive the band 1 and the hook 3 on the end of the band and the band is prevented from being drawn completely into the case by reason of the downturned portion of the hook 3 engaging the ends of the inturned flanges 131 and 132 on the bottom edges of the cover plates. Desirably, the bottom flanges 131 and 132 have pointers 26 formed thereon as is most clearly shown in Fig. 3 to act as a datum point cooperative with the scale indicia on the under side of the tape. Preferably the distance between the right side wall of the case 4 and the datum points 26 is an even multiple of the scale graduations on the tape and the numerals 27 on the under side of the tape begin with a numeral one greater than the number of scale units between the pointers 26 and the side of the case. Thus the scale and case are particularly adapted for making inside measurements as is more particularly described and claimed in my co-pending application for Measuring Tape, Serial Number 69,463, filed January 6, 1949.

Figure 1:
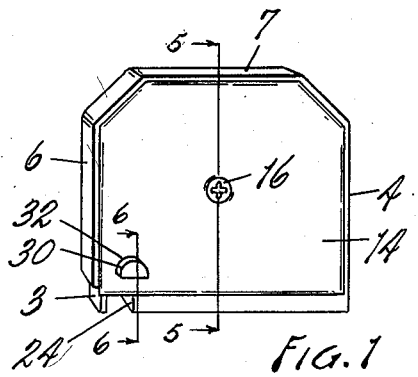
Fig. 1 is a perspective view of the tape and case in assembled condition.
Figure 6:
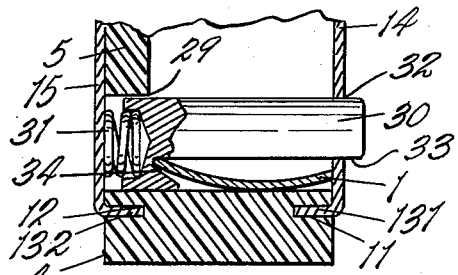
Fig. 6 is an enlarged fragmentary transverse cross sectional view through the case and brake mechanism taken along the plane of the line 6—6 in Figs. 1 and 4.

In order to restrain the spring 21 and the band 1 from unintentional retraction into the case, the left side wall 6 is provided with an inwardly extending projection 28 along the tape slot 25. The inner edges of the projection and the rear wall 4 of the case are cut away along a cylindrical surface as at 29 (see Figs. 4 and 6) to receive the rear end of a brake pin 30. A coil spring 31 is positioned between the rear cover plate 15 and the rear end of the brake pin to urge the pin forwardly through an aperture 32 provided therefore in the front cover 14. The under side of the pin 30 is cut away along a chord of the pin as at 33 and formed into a notch or hook 34 which receives and engages the rear edge of the band 1. The spring 31 thus clamps the edges of the band between the front cover 14 and the notch 34 to frictionally restrain the band against movement relative to the case. It will be noted that friction is applied to the edges of the band rather than to the surface where it might obliterate or deface the scale indicia on the band. To extend or retract the band freely, the operator has merely to press in the brake pin 30 where it projects through the front cover 14.

Having thus described my invention, what I claim as new and desire to secure by Letters Patent is:

1. In combination with a measuring tape having a downturned hook on the leading end thereof and having scale indicia and numerals on the top side thereof, a case for extensibly retaining said tape comprising a generally rectangular body having peripheral walls on its front face forming an open-sided recess on the said body, said peripheral walls being cut away at one corner of the case to form an entrance slot for said tape, a central post on said body projecting through said recess, a drum rotatably mounted on said post and adapted to have said tape wound around the outside thereof, a coil spring positioned within said drum and having its inner end anchored to said post and its outer end anchored to the periphery of said drum, the inner end of said tape being extended through a slot in the periphery of said drum and secured to the outer end of said spring, front and back cover plates secured to said body by screws threaded into said post, a brake pin having its inner end received in a hole in the back of said body and its outer end projecting through a hole in said front cover plate, said brake pin being cut away and notched axially to receive the width of said tape between said front cover plate and the notched portion of the pin, and a spring positioned between the inner end of said pin and said rear cover plate to urge said pin into braking engagement with said tape.

2. In combination with a measuring tape having a downturned hook on the leading end thereof and having scale indicia and numerals on the top side thereof, a case for extensibly retaining said tape comprising a generally rectangular body having peripheral walls on its front face forming an open-sided recess on the said body, said peripheral walls being cut away at one corner of the case to form an entrance slot for said tape, a central post on said body projecting through said recess, a drum rotatably mounted on said post and adapted to have said tape wound around the outside thereof, a coil spring positioned within said drum and having its inner end anchored to said post and its outer end anchored to the periphery of said drum, the inner end of said tape being secured to said drum, front and back cover plates secured to said body by screws threaded into said post, a brake pin having its inner end received in a hole in the back of said body and its outer end projecting through a hole in said front cover plate, said brake pin having an axially facing hook thereon toward its inner end to receive the width of said tape between said front cover plate and the hook on the pin, and a spring positioned between the inner end of said pin and said rear cover plate to urge said pin into braking engagement with said tape.

3. In combination with a measuring tape having a downturned hook on the leading end thereof and having scale indicia and numerals on one side thereof, a case for extensibly retaining said tape comprising a generally rectangular body having peripheral walls on its front face forming an open-sided recess on the said body, said peripheral walls being cut away at one corner of the case to form an entrance slot for said tape, a central post on said body projecting through said recess, a drum rotatably mounted on said post and adapted to have said tape wound around the outside thereof, a coil spring positioned within said drum and having its inner end anchored to said post and its outer end anchored to said drum, the inner end of said tape being secured to the periphery of said drum, a front cover plate secured to said body by a screw threaded into said post and having inwardly turned peripheral flanges engaged in slots around said body, a brake pin having its inner end received in a hole in the back of said body and its outer end projecting through a hole in said front cover plate, said brake pin being cut away and notched axially to receive the width of said tape between said front cover plate and the notched portion of the pin, and a spring positioned between the inner end of said pin and the rear wall of said case to urge said pin into braking engagement with said tape.

4. In combination with a measuring tape having a downturned hook on the leading end thereof and having scale indicia and numerals on one side thereof, a case for extensibly retaining said tape comprising a body having peripheral walls on its front face forming an open-sided recess on the said body, said peripheral walls being cut away at one point to form an entrance slot for said tape, a central post on said body projecting through said recess, a drum rotatably mounted on said post and adapted to have said tape wound around the outside thereof, a coil spring positioned within said drum and having its inner end anchored to said post and its outer end anchored to said drum, the inner end of said tape being secured to the periphery of said drum, a front cover plate secured to said body, a brake pin having its inner end received in a hole in the back of said body and its outer end projecting through a hole in said front cover plate, said brake pin having an outwardly facing hook thereon toward its inner end to receive the width of said tape between said front cover plate and the hook on the pin, and a spring positioned between the inner end of said pin and the rear wall of said case to urge said pin into braking engagement with said tape.

5. In combination with a flexible measuring tape having a retaining case, said tape being adapted to be extended through a slot in said case, brake means for said tape comprising a brake pin slidably and transversely mounted in the walls of said case adjacent to said slot and projecting through the front wall of the case, said brake pin being cut away axially and outwardly notched toward its inner end to receive the edges of said tape between the front wall of the case and the notched portion of the pin, and a spring positioned between the inner end of said pin and the rear wall of said case to urge said pin into braking engagement with said tape.

6. In combination with a flexible measuring tape having a retaining case, said tape being adapted to be extended through a slot in said case, brake means for said tape comprising a brake pin slidably and transversely mounted in said case adjacent to said slot and projecting through one wall of the case, said brake pin having an axially opening hook thereon toward one end to receive the edges of said tape between the side of the case and the hook, and a spring positioned between the inner end of said pin and a wall of said case to urge said pin into braking engagement with said tape.

7. In combination with a flexible measuring tape having a retaining case, said tape being adapted to be extended through a slot in said case, brake means for said tape comprising a brake element transversely slidably mounted in said case adjacent to said slot and projecting through one wall of the case, said brake element having a transversely opening hook thereon arranged to receive the edges of said tape between the side of the case and the hook, and spring means positioned between said element and said case to urge said element and hook into braking engagement with said tape.

WILLIAM F. DART.

REFERENCES CITED

The following references are of record in the file of this patent:

UNITED STATES PATENTS

| Number | Name | Date |
|---|---|---|
| 1,522,280 | Strom | July 6, 1925 |
| 2,132,202 | Carlson | Oct. 4, 1938 |
| 2,207,277 | Volz | July 9, 1940 |

FOREIGN PATENTS

| Number | Country | Date |
|---|---|---|
| 598,648 | France | Oct. 2, 1925 |